United States Patent

[11] 3,614,427

| | | |
|---|---|---|
| [72] | Inventor | Fernand L. Vacher<br>Plobsheim, France |
| [21] | Appl. No. | 847,608 |
| [22] | Filed | Aug. 5, 1969 |
| [45] | Patented | Oct. 19, 1971 |
| [73] | Assignee | Compagnie Generale de Radiologie<br>Paris, France |
| [32] | Priority | Aug. 27, 1968 |
| [33] | | France |
| [31] | | 164 248 |

[54] X-RAY APPARATUS HAVING COOPERATING MOVABLE CASSETTE CARRIER AND IMAGE INTENSIFIER PICKUP SCREEN
8 Claims, 4 Drawing Figs.

| | | |
|---|---|---|
| [52] | U.S. Cl. | 250/65 R,<br>250/66 |
| [51] | Int. Cl. | G03b 41/16 |
| [50] | Field of Search | 250/49.5 E,<br>65 R, 66 |

[56] References Cited
UNITED STATES PATENTS

| | | | |
|---|---|---|---|
| 2,560,085 | 7/1951 | Clausing | 250/65 |

FOREIGN PATENTS

| | | | |
|---|---|---|---|
| 447,159 | 3/1948 | Canada | 250/65 |
| 1,077,832 | 8/1967 | Great Britain | 250/65 |

*Primary Examiner*—William F. Lindquist
*Attorney*—Flynn & Frishauf

ABSTRACT: In an X-ray diagnostic apparatus comprising an X-ray image intensifier for visual (fluoroscopic) observation and a film cassette carrier for X-ray photography, the image intensifier comprises a movable pickup screen coupled to the cassette carrier to enable rapid locating of the film within the exposure field in the same plane as the intensifier pickup screen.

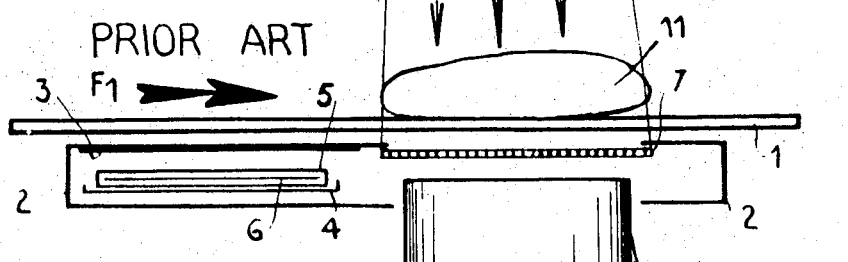
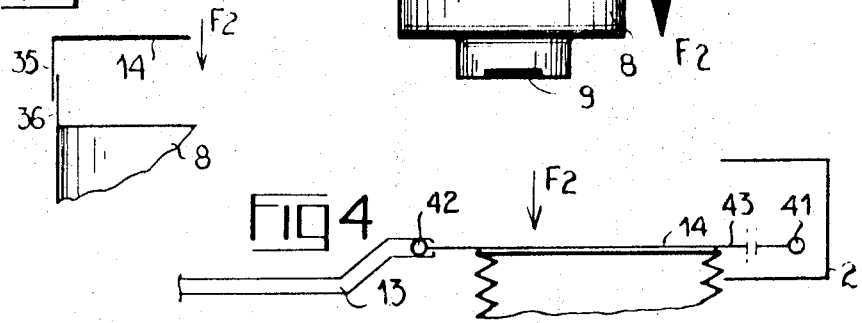
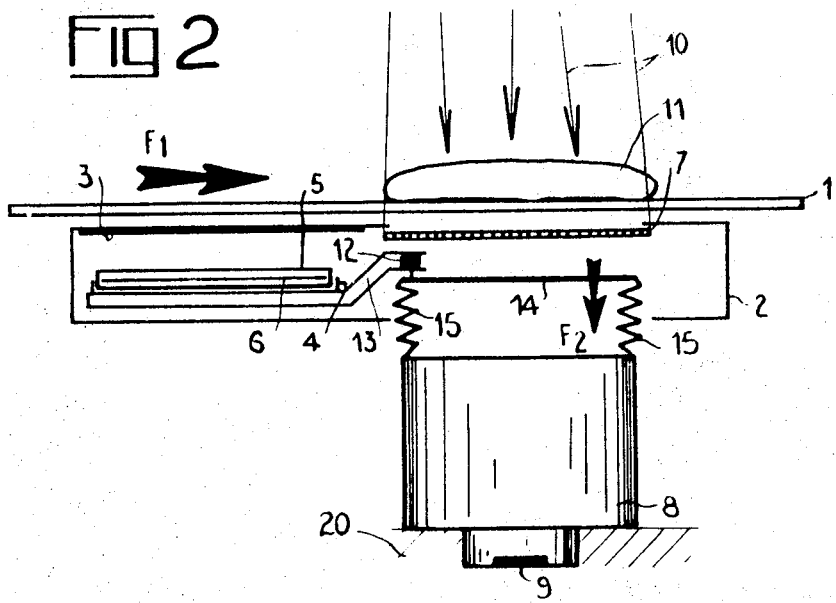
FERNAND L. VACHER,
Inventor

X-RAY APPARATUS HAVING COOPERATING MOVABLE CASSETTE CARRIER AND IMAGE INTENSIFIER PICKUP SCREEN

The present invention relates to X-ray diagnostic apparatus, and more particularly to such apparatus which permits quick change from viewing an X-ray image on a fluoroscopic to photographing the observable image.

When examining patients, and particularly when making stomach X-ray examination, it is frequently important to record, such as in a radiograph, the image of a mobile organ (for example the stomach); preferably, this record, or photograph should be taken at the moment chosen by the operator who observes, on a fluoroscopic screen or the like, the movement of the organ being irradiated. For certain purposes, a sequence of successive records, or photographs, are frequently desirable, without reverting to optical observation between successive photographs. Changeover from fluoroscopic observation to radiography must be fast, since the organs to be observed are often highly mobile. The delay between observation and photograph should thus be preferably only a fraction of a second.

Recording and viewing apparatus have been previously proposed; usually they include a housing which contains a cassette carrying the film. When in position for radiography, the cassette is placed behind the fluoroscopic screen; relatively to the viewer electrical changes in the equipment are simultaneously, automatically and quickly effected. In such apparatus it has been found difficult to locate the film in the same plane as the fluoroscopic screen, resulting in a difference in the observed, and recorded image. This difference may relate to the alignment, with respect to centering, enlargement, or focus. The difference is usually small when the distance of the film plane to the plane of the screen is small—for example a few millimeters in the case of a fluoroscopic screen. This difference may, however, become important if X-ray image intensifier or picture amplifiers are used rather than a screen of the fluoroscopic type. In any event, the difference in location between the image plane which is observed, and the image plane of recording introduces inaccuracies. Particularly when used with image intensifiers, it has been proposed to simultaneously displace the image intensifier pickup screen and the cassette so that the cassette will be located in the same plane as the pickup screen. Due to the speed of operation, however, difficulties have been encountered since light amplifiers are bulky and heavy—weighing about 30–40 kg. Amplification apparatus having optical focalization is even heavier; their weight may reach between 80 to 100 kg., so that the displacement time required to move this mass, that is several (2 to 3, for example) seconds becomes prohibitive.

It is an object of the present invention to provide an arrangement for radiographic apparatus in which film plane and a luminescent amplifier screen plane will be similar, and changeover can be effected quickly even if the mass of the light amplifier equipment is substantial.

Subject matter of the present invention

Briefly, the cassette is mounted on a slide, and a luminous amplifier screen is connected to the amplification apparatus itself in such a manner that it is lighttight yet movable, for example by bellows, sliding shrouds, or the like. If desired, and if the equipment demands, the space between the image intensifier and its movable pickup screen may be evacuated. In operation, the cassette operates the slide to depress the image amplifier pickup screen, so that the cassette will be enabled to take the position of the same, or only slightly different plane from that of the image intensifier. Since only the pickup screen, and the bellows need to be moved, displacement of the heavy mass of image intensifier equipment itself is avoided and changeover between a cassette carrying a film and image intensifier equipment permitting optical observation is effected rapidly.

Various types of image intensifiers may be used. In one, the screen is of the photoemissive type in which electrons are accelerated and then strike a secondary observation screen, the entire assembly being evacuated. In accordance with another type, which may be termed the optical focalization type, a fluorescent screen is used from which the image is optically focused, for example by spherical mirrors on an image tube. All types of amplifiers are enclosed in a housing or a protective casing which is designed to prevent passage not only of light rays, but also of stray, or undesirable X-rays. The optical focalization-type intensifier is much heavier than the light amplifier using accelerated electrons since the optical equipment is quite bulky.

The invention will be described by way of example with reference to the accompanying drawings, wherein;

FIG. 1 illustrates, schematically, equipment in accordance with the prior art;

FIG. 2 illustrates similar equipment and using the concepts of the present invention so that the difference will be obvious;

FIG. 3 is a fragmentary schematic view of a modified form of movement of the light-receiving screen;

and FIG. 4 is a fragmentary schematic view illustrating a different embodiment of operation of the screen.

A table 1 is provided to support the object, or person to be examined, schematically illustrated at 11. A housing 2 has an optical and X-ray opaque plate 3 placed thereon to protect film 6 located in a cassette 5 beneath table 1, when not in recording position. Cassette 5, itself, is located on a cassette carrier or slider 4. An antidiffusion grid or diaphragm 7 is in the path of X-rays 10 coming from an X-ray source (tube not shown) impinging on the face of a image amplifier 8, having an output or observation screen 9.

The cassette carrier 4 can be displaced by means, not shown and well known in the art, in the direction of arrow $F_1$ on tracks (not shown) to be aligned with the antidiffusion diaphragm 7, simultaneously with displacement of the image intensifier 8 in the direction of arrow $F_2$ along slides, and under control of motors, not shown and well known in the art. Thus, the position of the image plane in which film 6 is located may be exactly, or almost exactly the same as that of the image intensifier pickup screen 8. The movement of carrier 4 in the direction of arrow $F_1$ and the movement of image intensifier 8 in the direction of arrow $F_2$ can be controlled mechanically be an interlocked system known in the art.

It will be immediately clear that movement of the mass of image intensifier 8 requires considerable force and, to displace the entire image intensifier in a fraction of a second, in turn requires use of powerful mechanical apparatus. Intensifiers of the optical focalization type, particularly, may have a weight which is too great to be moved readily. The present invention has as its object to overcome this difficulty.

The parts already described in connection with FIG. 1 have been given the same reference numerals and will not be referred to again. Referring now to FIG. 2, the image intensifier 8 which, as shown, may be of the optical focalization type is fixed to the support for the table, just as unit 2, as schematically indicated at 20. The screen 14 of the image intensifier 8, however, is not secured to the light amplifier itself but is movable. The pickup screen 14 is connected by a lighttight yet movable connection to the image intensifier; FIG. 2 illustrates a bellows 15. Screen 14 is guided in its movement in accordance with arrow $F_2$ by tracks or other mechanical means, such as linkages, not shown and well known in the art; they provide for essentially parallel displacement of the screen 14 from the position shown in FIG. 2. Screen 14 is connected to a roller or track follower 12.

The cassette carrier 4 is arranged on tracks and, as previously noted, may displace in the sense of the arrow $F_1$ in the same manner as already described in connection with FIG. 1. In order to provide for displacement of the screen 14 itself, a cam track 13 is secured to the cassette carrier 4. The cam track has an inclined guide way which is engaged by the roller or cam follower 12 secured to screen 14. When cassette holder 4 is removed in the direction of arrow $F_1$, in order to be placed into the position to receive a radiographic picture, the cam track 13 secured to the cassette carrier forces the roller 12, and with it screen 14 downwardly in the direction of arrow F₂ to depress the bellows and permit placement of the cassette 5, and with it film 6 in exposure position. The plane of film 6 will be, preferably, in the same plane as that of screen 14 although, if desired, the plane can be shifted for special effects.

Large masses or heavy weights need not be moved; the screen itself is light and the bellows 15 permit ready displacement with little force. Only light and rapidly operating mechanical drives are required.

FIG. 3 illustrates a modification; the bellows 15 are here replaced by sliding, telescoping shroud elements 35, 36 secured respectively to screen 14 and image intensifier 8, to permit movement of screen 14 in the direction of arrow F₂ while maintaining the screen and the image intensifier in lighttight relationship.

FIG. 4 illustrates a solution to permit screen 14 to move out of the path of the cassette holder 4. Rather than being displaced parallel, screen 14 is pivoted by means of a screen holder 43 about a shaft 41. The other end of screen holder 43 is connected to a cam or track follower, preferably a roller 42 which slides in cam track 13, the cam follower being depressed and depressing with it screen 14 to rotate about shaft 41 and permit placement of the film beneath object 11 in lieu of screen 14.

Image intensifier unit 8 may be directly secured to the housing 2, preferably in lighttight relationship. A light trap is preferably provided to permit introduction of the film cassette 5. With such an arrangement, a lighttight interconnection between the movable screen 14 and image intensifier 2 can be omitted.

The apparatus has been described with respect to a image intensifier utilizing optical focalization, but it is equally applicable to other installations, for example to amplifier installation utilizing electron acceleration techniques, together with a camera. In such a case, the movable element 14 will not be a fluorescent screen, but the photoemissive pickup screen of the intensifier; the space beneath the pickup screen and the image intensifier itself will be evacuated. The light and vacuumtight support to the light amplifier, for example a bellows, may then remain fixed at one end, the bellows providing for sufficient movement.

Various changes and modifications may be made within the inventive concept as required by design considerations.

I claim:

1. An X-ray diagnostic apparatus comprising: an X-ray source, a housing; a film cassette carrier for receiving film contained in cassettes, said carrier being movable within said housing, along a first plane substantially parallel to that of said film, into and out of an exposure field defined by said X-ray source; an X-ray image intensifier secured to said housing having a movable pickup screen for receiving the incident X-rays, said movable screen being connected to said fixed image intensifier by lighttight and movable connecting means;

a guiding track secured to said movable cassette carrier including a portion inclined relatively to said film plane; and a track follower engaging with said track and connected to said movable screen which is permanently located within said exposure field, said inclined portion of said guiding track and said track follower being thus arranged what whenever said carrier is withdrawn from and inserted into said exposure field said screen is respectively displaced into or away from a second plane located in the vicinity of and substantially parallel to that of said film, the initial direction of the motion of said screen away from said second plane being substantially perpendicular thereto, whereby ensuring a rapid and automatic changeover from radioscopy to radiography and vice versa.

2. Apparatus as claimed in claim 1, wherein said guiding track and track follower are so arranged that said second plane substantially coincides with that of said film.

3. Apparatus according to claim 1, wherein said X-ray image intensifier is of the optical focalization type, said movable pickup screen being fluoroscopic.

4. Apparatus according to claim 3, wherein said lighttight and movable connecting means are bellows lighttightly secured to both said intensifier and said screen.

5. Apparatus according to claim 3, wherein said lighttight and movable connecting means are telescoping shrouds whose extremities are respectively lighttightly secured to said intensifier and said screen.

6. Apparatus according to claim 1, wherein said X-ray image intensifier is of the electronoptical type, said movable pickup screen being photoemissive and wherein said lighttight connecting means are made up from light- and vacuumtight bellows vacuumtightly interconnecting both said screen and said intensifier, the space between said screen and said intensifier being evacuated.

7. Apparatus according to claim 1, wherein one side of said pickup screen is pivotally secured to said housing by means of pivot means having a pivot axis perpendicular to the direction of the movement of said carrier; the opposite side of said screen being engaged in said guiding track by means of a track follower secured thereto, whereby said screen is made to pivot away from said second plane about said pivot means, when said carrier is being inserted into said exposure field.

8. Apparatus according to claim 1, wherein the motion of said screen is perpendicular with respect to the plane of the film.